July 28, 1959
C. W. HEBBERT
2,896,481
SAW SHARPENING APPARATUS
Filed Dec. 2, 1957
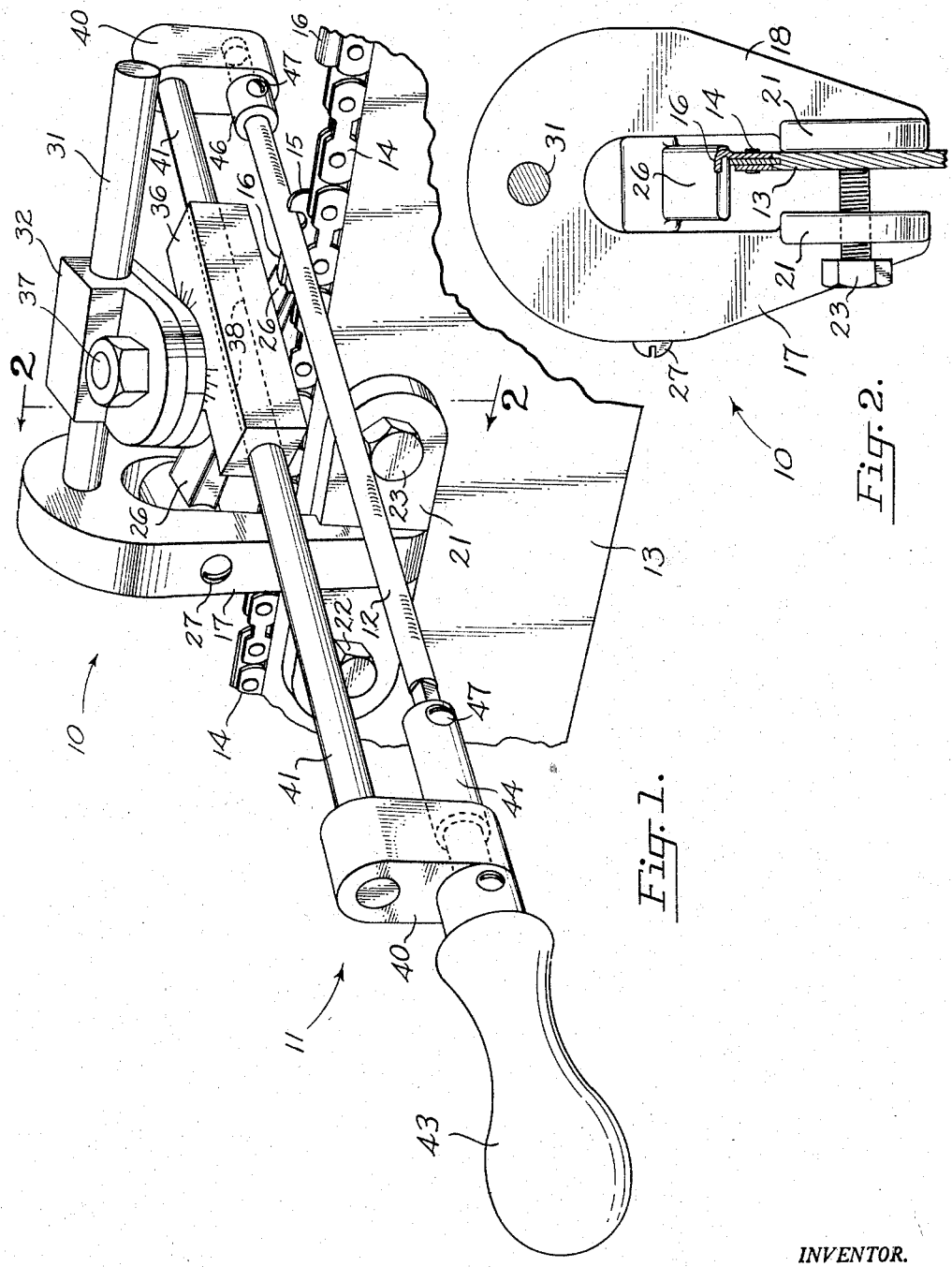
INVENTOR.
Clarence W. Hebbert
BY
Ramsey and Kolisch
Attys.

United States Patent Office 2,896,481
Patented July 28, 1959

2,896,481

SAW SHARPENING APPARATUS

Clarence W. Hebbert, Gladstone, Oreg.

Application December 2, 1957, Serial No. 700,075

6 Claims. (Cl. 76—31)

This invention relates to sharpening apparatus for saws, and more particularly to sharpening apparatus of the type which may be employed for sharpening the cutting elements of chain saws. The invention is characterized by a number of novel construction features which contribute to greater precision in saw filing, and greater speed in setting up successive cutting elements in a chain saw prior to filing the same.

Generally it is an object of this invention to provide improved saw filing apparatus which may be used for accurate, precision filing of most any of the chain saws presently found on the market.

Another general object of the invention is to provide apparatus of the type described which is fast in operation, and which may be adjusted readily for proper filing of either the left or the right hand cutters of a chain saw.

Power chain saws conventionally include a blade which mounts the chain saw portion of the saw, and the chain moves about the periphery of the blade upon actuation of the motor for the saw. The usual cutting elements for the saw include elongated cutters of hook-shaped cross-section, which move through a saw kerf behind a rake tooth disposed in front of each cutter. The turned over portion of a cutter routs out the bottom of a saw kerf and the side portion of a cutter routs out the sides of a saw kerf. This invention contemplates sharpening apparatus wherein the leading or cutting edges of a cutter may be accurately and rapidly filed with a high degree of precision, and wherein all the cutters of a series of cutters may be sharpened to have cutting edges which are beveled uniformly.

Chain saws commonly have successive cutters facing opposite directions. That is, the side portion of one cutter will be carried on a chain saw on one side of the chain, and the side portions of preceding and succeeding cutters will be carried on the opposite side of the chain. The bevels of the cutting edges of two successive cutters thus are inclined in opposite directions. A more specific object of this invention is to provide sharpening apparatus including a file wherein the file may be readily swung about to accommodate proper filing of the cutting edge of a cutter regardless of its position on the chain, without removing the apparatus from the blade of a chain saw.

It is another object of this invention to provide sharpening apparatus which includes a novel locking member or portion operable to engage the trailing end of a cutting element during sharpening, thereby positively to lock the chain from movement during the sharpening operation. In a preferred embodiment, the locking member is pivotally mounted to a clamping portion in the apparatus. During the filing of a chain saw, the saw chain is pulled along through the apparatus after a cutter is sharpened to set up a new cutter for sharpening. The pivotal mounting for the locking member enables the member to swing freely up over a cutter during positioning of the chain saw.

It is another object of this invention to provide apparatus of the type described which includes novel mechanism mounting the file carriage which holds the file employed in the apparatus. The mechanism includes an elongated, cylindrical bar portion which is affixed at its inner end to a clamp gripping the blade of a chain saw. Slidably mounted on the bar is a fastener member, which is attached by means of a screw tightened member to a guide portion reciprocally carrying the file carriage. The screw tightened member connecting the guide portion and fastener member may be loosened to accommodate adjustment in the spacing of the fastener member toward and away from the clamp in the apparatus, as well as rotation of the fastener member relative to the clamp. The guide portion, when the screw tightening member is loosened, swivels with respect to the fastening member enabling adjustments in the position of the guide portion.

A further object is to provide such mechanism wherein the file may be rotated during use, thereby to reduce wear in the file. Rotation of the file also contributes to the production of a better cutting edge.

These and other objects and advantages are attained by the present invention, various other novel features of which will become more fully apparent as the following description is read in conjunction with the accompanying drawings wherein:

Fig. 1 is a perspective view illustrating sharpening apparatus constructed according to this invention, and showing the apparatus mounted on a conventional chain saw blade; and Fig. 2 is a section view along the line 2—2 in Fig. 1, illustrating the configuration of the clamping portion or clamp member present in the apparatus.

Referring now to the drawings for a description of a specific embodiment of this invention, the apparatus illustrated comprises generally a clamping portion indicated at 10 fitted over a saw blade 13 of a chain saw and clamped onto the blade, and a file carriage 11 including a file 12 carried outwardly to one side of clamping portion 10 with the file in position to swing into and against the cutting edge of a cutting element in a saw chain. A saw chain 14 is carried on blade 13. The saw chain has arranged therealong a series of cutting elements, each including a rake portion 15 and a hook-shaped cutter portion 16.

Referring to Fig. 2, clamping portion 10 in the embodiment illustrated has a U-shaped body. The body includes downwardly depending leg portions 17 and 18 spaced apart from each other by the upper portion of the body, and defining thereinbetween a slot for the reception of saw blade 13.

Each of the leg portions has extending transversely along the base thereof an elongated brace portion indicated at 21. With reference again to Fig. 2, it will be noted that the inner faces of the brace portions are disposed slightly inwardly of the inner extremities of the legs. This enables the clamping portion securely to be affixed to the blade of a saw while enabling free passage of the saw chain through the slot defined between the legs. It should be understood that a saw chain is usually somewhat wider than the blade supporting the chain.

One of the elongated brace portions has mounted therein a pair of spaced screw clamps indicated at 22 and 23. The clamp for the apparatus is securely fixed in place by tightening screw clamps 22, 23 against one face of the saw blade thereby to bring the inner face of the opposite brace portion into contact with the opposite face of the saw blade. A pair of spaced screw clamps are employed in order that the clamp be securely fixed against swinging movement in the plane of the saw blade when filling pressure is introduced on a cutter.

Mounted between legs 17 and 18 is a locking member or element 26. The locking member is mounted so that the lower end thereof is free to swing toward and away from the base of clamp portion 10. Specifically, the upper end of the locking member is pivoted intermediate upper extremities of the legs by means of pivot screw 27 extending between the two legs. During filing, the lower end of member 26 engages the trailing end of a cutter, as shown in Fig. 1. The chain may be moved freely from left to right in Fig. 1 with element 26 pivoting up over a cutter as it is advanced beneath the element.

Secured to an upper portion of the clamping member is a cylindrical bar or rod 31 which functions as part of the mechanism holding file carriage 11 outwardly to one side of clamp 10. Slidably and rotatably positionable on rod 31 is a fastener member 32. The fastener element takes the form of a U-clamp, with the base of the clamp surrounding bar 31.

A guide portion 36 is fastened to the under side of fastener member 32 by a nut and bolt 37 extending upwardly through an ear of the guide portion and the outer end of fastener 32. The bolt constitutes a screw tightened member in the mechanism. Adjustment of the spacing between the fastener member and the clamp portion and adjustment of the angular position of guide portion 36 with respect to the fastener member is made after loosening the nut on bolt 37. The parts are then secured in position after adjustment by tightening the nut down on bolt 37.

Guide portion 36 has extending therethrough a cylindrical bore 38. This bore slidably receives a cylindrical rod portion 41 of bow-shaped file carriage 11 which carries file 12. An end portion 40 is affixed in place at each end of rod 41. In filing, the file carriage is moved back and forth within the guide portion. Bore 38 accommodates pivotal movement of the file carriage about an axis which is coincident with the longitudinal axis of rod portion 41.

The file carriage has a handle 43 secured to the outer end of a coupler or file holder element 44. Coupler element 44 extends through an accommodating bore formed in an end portion 40 depending from one end of rod 41. Handle 43 is nonrotatably affixed to coupler element 44, and coupler element 44 is rotatably received in end portion 40.

The end portion 40 at the other end of the file carriage rotatably mounts a file holder element 46. Element 46 and element 44 each contain an axially extending bore adapted to receive the ends of a file. A file, such as file 12, is fixed in position in the carriage by screws 47.

Guide portion 36 extends outwardly to either side of bolt 37. Each end of the guide portion has formed therein calibrations indicating the relative angular position of the guide portion with respect to fastener element 32. Fastener element 32 has a mark scored therein which is mated with the calibrations on portion 36 when setting up the apparatus.

In operation, clamping portion 10 is fitted over the blade of a saw and secured to the blade by tightening screws 22, 23. The saw chain is then moved from left to right in Fig. 1 until the cutter which is to be sharpened is positioned with its trailing end free of the lower end of locking member 26. The saw chain is then backed up until the heel of the cutter abuts the lower end of member 26, and the cutter is held firmly in a fixed position. The file is then swung inwardly against the cutter to produce contact. During filing of the cutter illustrated against the file in Fig. 1, the file normally is pressed against the cutter while moving the file from left to right in Fig. 1.

When it was desired to sharpen the cutters carried on the other side of the saw chain, the file carriage is swung around by swiveling guide portion 36 about bolt 37, so that handle 43 of the file carriage is carried on the opposite side of the saw blade. After proper positioning of the guide portion has been established, the nut is tightened on bolt 37 to fix the parts prior to filing.

The spacing between the cutting edges of the different cutters varies depending upon the age of the saw and its make. It is important therefore that relative adjustment be permitted in the spacing between the end of locking member 26 and fastener member 32. In the embodiment illustrated, the lower end of locking member 26 establishes a position for the heel of a cutter which is constant. The sliding mounting described for the fastener member promotes easy adjustment of the fastener to take care of different sizes of cutters.

The file is rotatably mounted in the ends of the file carriage so that the file may be rotated during filing. This reduces wear on the file and also results in the production of a better edge.

During the filing operation, the file carriage is swung in a clockwise direction in Fig. 1, to push the file against a cutter. The filing pressure is transmitted to the clamping portion by locking member 26. Spaced screws 22, 23 for the clamping member are included to keep the clamping member from swinging in the plane of the saw blade during filing.

While there has been described a specific embodiment of this invention, it is intended not to be limited by the specfic form of the invention illustrated. It is desired to cover all modifications and variations which would be apparent to one skilled in the art and that come within the scope of the appended claims.

It is claimed and desired to secure by Letters Patent:

1. Sharpening apparatus for sharpening the cutting elements of a saw comprising a clamping portion having depending leg portions spaced apart from each other and defining thereinbetween a slot for the reception of a saw blade, a locking member pivoted at its upper end intermediate upper extremities of said leg portions with the lower end thereof pivoting toward and away from the base of said clamping portion, a file carriage, and means secured to said clamping portion mounting said file carriage outwardly to one side of said clamping portion, the latter means accommodating shifting in the position of said file carriage toward and away from the pivot for said locking member.

2. Sharpening apparatus for sharpening the cutting elements of a saw comprising a clamping portion having depending leg portions spaced apart from each other and defining thereinbetween a slot for the reception of a saw blade, a locking member and mounting means mounting said locking member on said clamping portion intermediate said leg portions, said mounting means accommodating movement of the lower end of said locking member toward and away from the base of said clamping portion, a file carriage, and means mounting said file carriage outwardly to one side of said clamping portion, said last-mentioned means including an elongated bar portion affixed at its inner end to said clamping portion, and extending outwardly therefrom, a fastener member adjustably positionable along the length of said bar portion, and a guide portion slidably holding said file carriage secured to said fastener member.

3. The construction of claim 2 wherein said guide portion is secured to said fastener member by means accommodating swivel movement of said guide portion relative to said fastener member.

4. Apparatus for sharpening saws comprising a clamping portion having depending legs spaced apart from each other and defining thereinbetween a slot for the reception of a saw blade, an elongated bar portion affixed to the upper end of said clamping portion extending outwardly to one side thereof, a fastener member adjustably positionable along the length of said bar portion, a file carriage, a guide portion slidably holding said file carriage, and means securing said guide portion to said fastener member accommodating swivel movement of said guide portion relative to said fastener member, said last-mentioned means having a screw tightened member which may be tightened to fix simultaneously said guide portion and fastener member in selected positions of adjustment.

5. Apparatus for sharpening saws comprising a clamping portion having depending legs spaced apart from each other and defining thereinbetween a slot for the reception of a saw blade, an elongated bar portion affixed to the upper end of said clamping portion extending outwardly to one side thereof, a fastener member adjustably positionable along the length of said bar member, a file carriage, said file carriage having a bow frame with each end thereof rotatably mounting a file holder, a guide portion slidably and rotatably holding said frame of said file carriage, and means securing said guide portion to said fastener member accommodating swivel movement of said guide portion relative to said fastener member.

6. Sharpening apparatus for sharpening the cutting elements of a saw comprising a U-shaped clamping portion having depending legs spaced apart from each other and defining thereinbetween a slot for the reception of a saw blade, a locking member pivoted at its upper end intermediate upper extremities of said legs with the lower end thereof pivoting toward and away from the base of said clamping portion, a cylindrical bar portion affixed at its inner end to the upper end of said guide portion extending outwardly to one side thereof, a fastener member adjustably positionable long the length of said bar portion and adjustably rotatable relative to said bar portion, a file carriage, a guide portion slidably holding said file carriage, and means securing said guide portion to said fastener member accommodating swivel movement of said guide portion relative to said fastener member.

References Cited in the file of this patent

UNITED STATES PATENTS

| | | |
|---|---|---|
| 238,872 | Ellis | Mar. 15, 1881 |
| 566,003 | Mitchell | Aug. 18, 1896 |
| 976,091 | Miller | Nov. 15, 1910 |
| 2,677,289 | Fitch | May 4, 1954 |